No. 873,900.   
PATENTED DEC. 17, 1907.

F. W. SANFORD.  
SCREW DRIVING MACHINE.  
APPLICATION FILED APR. 14, 1902.

WITNESSES:  
Fred E. Dow.  
Addie F. Hurlbut.

INVENTOR.  
Frank W. Sanford  
BY  
Ira L. Fish  
ATTORNEY.

UNITED STATES PATENT OFFICE.

FRANK W. SANFORD, OF BOSTON, MASSACHUSETTS, ASSIGNOR, BY MESNE ASSIGNMENTS, TO MARSHALL ELECTRIC MANUFACTURING COMPANY, OF BOSTON, MASSACHUSETTS, A CORPORATION OF MASSACHUSETTS.

SCREW-DRIVING MACHINE.

No. 873,900.

Specification of Letters Patent.

Patented Dec. 17, 1907.

Application filed April 14, 1902. Serial No. 102,755.

*To all whom it may concern:*

Be it known that I, FRANK W. SANFORD, of Boston, in the county of Suffolk and State of Massachusetts, have invented certain new and useful Improvements in Screw-Driving Machines, of which the following is a specification.

The object of the invention is to provide a machine whereby screws may be rapidly and conveniently inserted in metal plates or other work.

To this end the invention comprises means for presenting the screw in position to be inserted and means for rotating the screw to drive it into the work.

The invention also comprises means for separating screws from a mass of screws and presenting them successively in position to be inserted in the work and means for rotating the screws to drive them into the work.

In addition to these features the invention comprises further features which are of importance in contributing to the efficiency and simplicity of a machine embodying the broad features. One of these features comprises means for holding the screw which is so mounted that it will move with the screw until the screw has entered the work and which is then operated to release the screw so that it may be driven home.

These and the other features of the invention will be best understood from a detailed description of a machine in which I have embodied all the various features of my invention.

Figure 1:
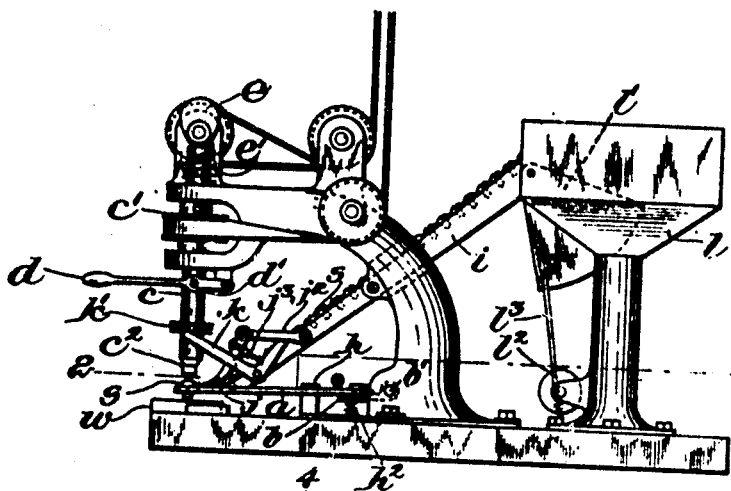
Figure 2:
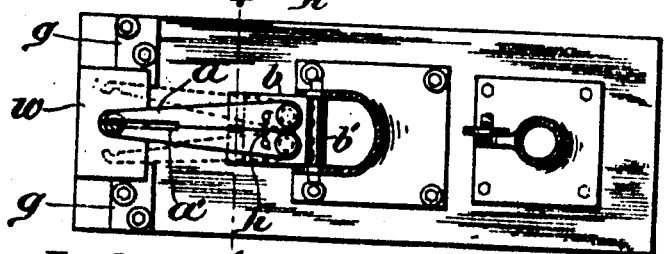
Figure 3:
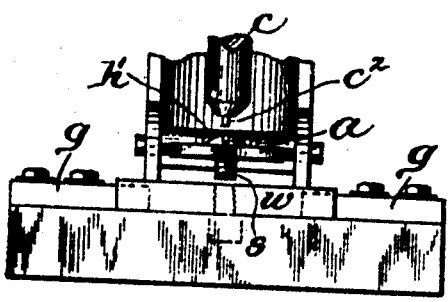
Figure 4:
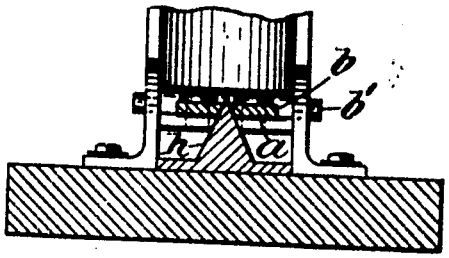

In the drawings Figure 1 is an elevation of such machine. Fig. 2 is a sectional plan view on line 2—2 Fig. 1. Fig. 3 is a detail showing the screw holder and screw driver, and Fig. 4 is a section on line 4—4 Fig. 2.

In the machine shown in the drawings the screw $s$ to be inserted into the work indicated at $w$, is held in position above the work by a holding device consisting of two jaws $a$ which engage the shank of the screw below its head. These jaws are in the form of levers pivoted to a carrier $b$ so that they may be moved away from each other to release the screw and also to allow the head of the screw to pass between them. The carrier $b$ is pivoted at $b'$ so that the jaws $a$ may move with the screw as it is carried towards the work and may continue to support the screw until it has been partially inserted in the work.

The screw is driven into the work by a screw driver $c$ arranged to engage the head of the screw and rotated through a pulley $c'$ so connected with the driver that the driver is rotated thereby while being free to move longitudinally therethrough. The screw driver may be moved towards and away from the work by a lever $d$ which is connected with the driver through a pin $d'$ projecting into an annular groove in the driver, or the driver may be reciprocated automatically through a rotary cam $e$ arranged above the end of the driver and a spring $e'$ which holds the driver in engagement with the cam.

To insert a screw the work is placed in position under the screw holder where it may be positioned by suitable gages as $g$ with the hole into which the screw is to be driven directly under the screw carried by the holder. The driver is then brought down onto the head of the screw and carries the screw down towards the work, the screw holder swinging about the pivot $b'$ and presenting the screw to the hole in the work. As the screw is carried downward the teat $c^2$ at the end of the driver engages the slot in the head of the screw and rotates the screw so that it is screwed into the hole in the work. When the screw has been introduced into the hole in the work and no longer requires any other support the jaws of the carrier are opened and pass from under the head of the screw so that the head may be brought down into engagement with the work.

The means employed for opening the jaws of the screw holder consists of a wedge shaped cam $h$ which passes between the levers forming the jaws and spreads them apart as the jaws are drawn towards each other by a spring $h'$ and are held up in normal position by a spring $h^2$.

The screws are automatically fed to the screw holder from a feed chute $i$ by a reciprocating finger $j$. This finger is pivoted to the free end of an arm $j^2$ pivoted to the chute $i$ and is held in engagement with the upper surface of the chute by a spring $j^3$. The feeding finger is operated from the screw driver through a lever $k$ the rear end of which engages the arm $j^2$ and the other front end of which is engaged by a collar $k'$ on the driver. When the driver is moved downward the lever $k$ is rocked and lifts the arms $j^2$ thereby drawing the finger $j$ rearward over the head of the screw just back of said finger.
When the driver is raised the feeding finger moves forward pushing the screw in front of it forward into the screw holding jaws.

The screw holder is provided with a slot $a'$ along which the shank of the screw passes as it is pushed forward by the feeding finger into position at the forward end of the slot which is shaped to fit the shank of the screw and hold it in position. Thus at each upward movement of the screw driver a screw is separated from the screws in the feed chute and presented in position to be operated upon by the driver on its next downward movement.

The feed chute consists of an inclined track formed of two rails $i$ between which the shanks of the screws pass, the screws being supported by the engagement of the heads with the upper edges of the rails. The screws are separated from a mass of screws in a hopper $l$ by two oscillating plates $l'$ which form continuations of the rails $i$. As these plates pass up through the screws in the hopper some of said screws are picked up and these screws slide down onto the rails $i$ as the upper edges of the plates become inclined towards the rails. The plates are operated from a crank wheel $l^2$ through a connecting rod $l^3$.

What I claim and desire to secure by Letters Patent is:

1. A screw driving machine comprising means for rotating the screw to drive it into the work, a screw holder moving with the screw, and devices for opening the holder as it moves with the screw, substantially as described.

2. A screw driving machine comprising a rotary and reciprocating screw-driver for engaging and driving the screw, screw holding jaws arranged to underlie the head of the screw and guide it until engaged with the work, and devices whereby the movement of the jaws with the screw carries the jaws out of the path of the screw head, substantially as described.

3. A screw driving machine comprising a rotary and reciprocating screw driver for engaging and driving the screw, a feed chute for the screws, screw holding jaws separated by a slot extending in the same direction as and forming a continuation of the guiding slot of the feed chute, and forming a guideway along which the shank of the screw passes as the screw is fed into position, substantially as described.

4. A screw driving machine comprising a rotary and reciprocating screw driver for engaging and driving the screw, a feed chute for the screws, a screw holder comprising two screw supporting arms separated by a slot arranged in line with and extending from the slot in the feed chute to the ends of the arms by which the screws are guided to a position under the screw-driver, and devices for separating individual screws from the screws in the chute and delivering them to the holder, substantially as described.

5. A screw driving machine comprising a rotary and reciprocating screw-driver for engaging and driving the screws, a feed chute for the screws, a screw holder comprising two yieldingly supported arms separated by a slot arranged in line with and forming a continuation of the slot in the feed chute by which the screws are guided as they pass from the chute to a position under the screw driver, devices for separating and delivering individual screws from the screws in the feed chute, and devices for separating the screw holder arms as they move downward with the screw, substantially as described.

6. A screw driving machine comprising a rotary and reciprocating screw driver for engaging and driving the screw, a screw holder provided with jaws for underlying the head of the screw and guiding it until engaged with the work, a feed chute for the screws, a slot in the screw holder in line with and extending from the chute to the jaws, devices for moving the jaws out of the path of the screw head as the screw enters the work, and means for separating individual screws from the screws in the chute, and delivering them to the jaws, substantially as described.

7. A screw driving machine comprising a screw driver, a yielding screw holder provided with jaws, a feed chute for the screws, a slot separating the jaws of the screw holder in line with and extending from the chute to the jaws, and devices for separating individual screws from the screws in the chute and delivering them to the jaws, substantially as described.

8. A screw driving machine comprising a rotary and reciprocating screw driver for engaging and driving the screw, a feed chute for the screws, a screw holder consisting of two jaws mounted to yield in the direction of movement of the screw and also to swing away from each other, and stationary cam surfaces for spreading the jaws as they are moved downward by the engagement of the screw head therewith, substantially as described.

9. A screw driving machine comprising a rotary and reciprocating screw driver for engaging and driving the screws, screw holding jaws arranged to underlie the head of the screw, devices for feeding individual screws to the jaws, and devices whereby the movement of the jaws with the screw carries the jaws out of the path of the screw head, substantially as described.

In testimony whereof I have affixed my signature, in presence of two witnesses.

FRANK W. SANFORD.

Witnesses:
  N. MARSHALL,
  C. A. SANDERS.